(12) United States Patent
Koo et al.

(10) Patent No.: US 12,242,500 B2
(45) Date of Patent: Mar. 4, 2025

(54) DATA PROCESSING METHOD AND DATA COMPARING METHOD

(71) Applicant: SEMES CO., LTD., Chungcheongnam-do (KR)

(72) Inventors: Ki-Sung Koo, Gyeonggi-do (KR); Jae Yeong Jeon, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/829,634

(22) Filed: Jun. 1, 2022

(65) Prior Publication Data

US 2022/0391406 A1 Dec. 8, 2022

(30) Foreign Application Priority Data

Jun. 2, 2021 (KR) .......................... 10-2021-0071251

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
CPC .......................... G06F 16/258; G06F 16/1794
See application file for complete search history.

(56) References Cited

U.S. PATENT DOCUMENTS

| | | | | |
|---|---|---|---|---|
| 7,364,839 | B2* | 4/2008 | Hayasaki | G03F 7/40 430/322 |
| 10,210,627 | B1* | 2/2019 | Vitsnudel | G06V 30/1914 |
| 10,635,951 | B1* | 4/2020 | Liu | G06V 10/82 |
| 2018/0129934 | A1* | 5/2018 | Tao | G06N 3/084 |
| 2019/0274598 | A1* | 9/2019 | Scott | A61B 5/14546 |
| 2020/0294508 | A1* | 9/2020 | Kwasiborski | H04R 25/505 |
| 2021/0064987 | A1* | 3/2021 | Springer | G06N 3/045 |
| 2021/0141988 | A1* | 5/2021 | Ungar | G03F 1/44 |
| 2022/0222859 | A1* | 7/2022 | Takagi | G06T 7/143 |

FOREIGN PATENT DOCUMENTS

| | | | |
|---|---|---|---|
| KR | 10-1890805 B1 | 8/2018 | |
| KR | 10-2197155 B1 | 12/2020 | |

* cited by examiner

*Primary Examiner* — Kris E Mackes
*Assistant Examiner* — Lin Lin M Htay
(74) *Attorney, Agent, or Firm* — Carter, DeLuca & Farrell LLP

(57) ABSTRACT

The inventive concept provides a method for processing data generated at a substrate treating. The method includes dividing the data according to each process of the substrate treating; and converting the divided data to a same size. In an embodiment, converting the divided data t a same size comprises converting the divided data to the same size using an ID convolution.

17 Claims, 11 Drawing Sheets

FIG. 1

DATA PROCESSING METHOD AND DATA COMPARING METHOD

CROSS-REFERENCE TO RELATED APPLICATIONS

A claim for priority under 35 U.S.C. § 119 is made to Korean Patent Application No. 10-2021-0071251 filed on Jun. 2, 2021, in the Korean Intellectual Property Office, the entire contents of which are hereby incorporated by reference.

TECHNICAL FIELD

Embodiments of the inventive concept described herein relate to a data processing method and a data comparing method, more specifically, a pre-processing method of a data for applying to a Siamese network and a data comparing method using the same.

BACKGROUND

Since a data generated by semiconductor manufacturing facilities can be used for an error detection through a data analysis, an equipment repair using the data, and the like, an analysis of the data is an important issue in semiconductor manufacturing facilities. In this case, recognizing a data in which a change occurs is one of the important issues. To this end, it is an important issue to determine whether a data at each respective facility is the same.

Figure 1:
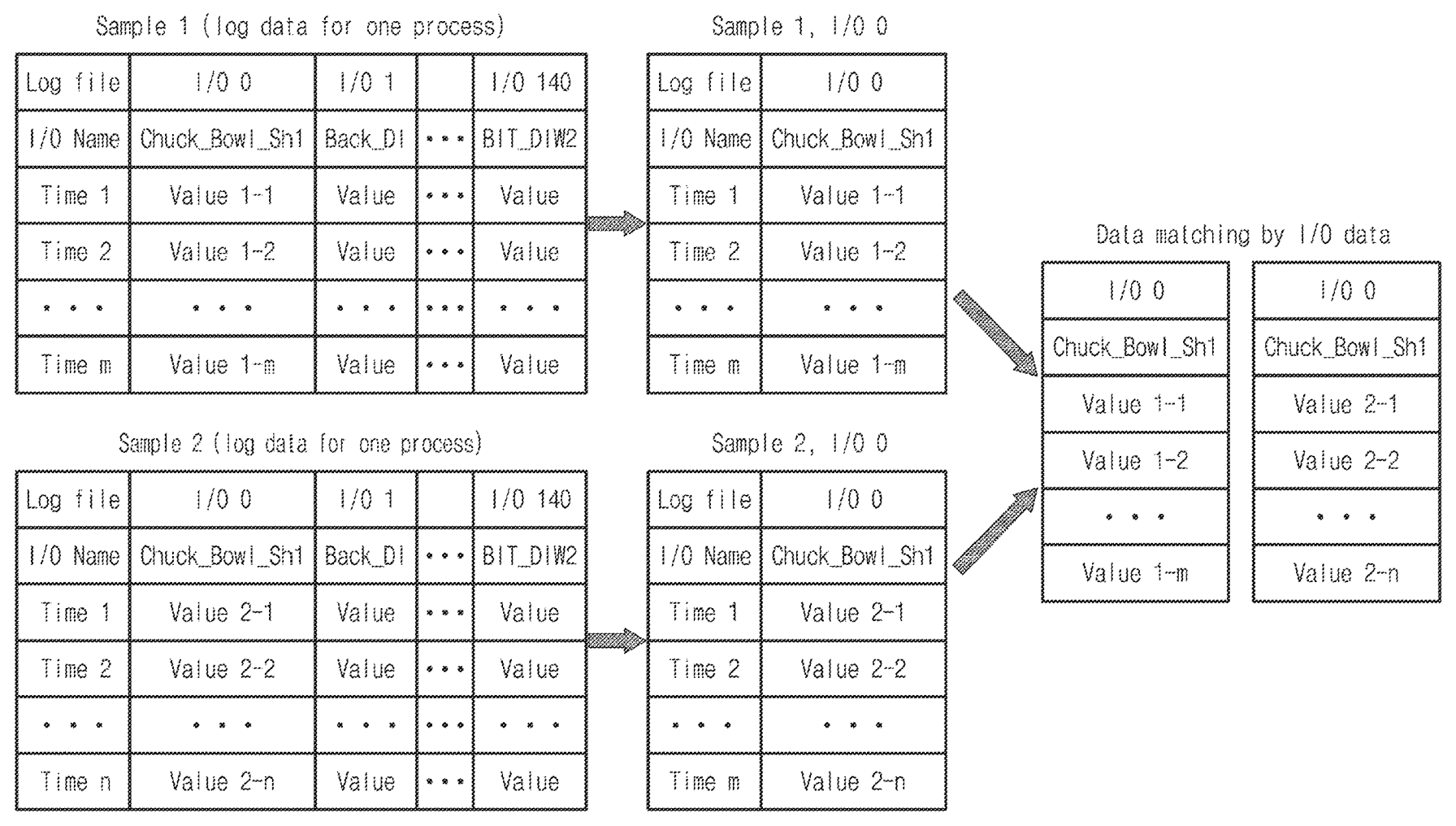

FIG. 1 to FIG. 2 illustrate a data comparing method in a conventional method. In the case of the prior art, when calculating a matching rate, that is, a similarity, for log sample 1 and log sample 2 in the same process, the similarity is calculated in units of I/O data. That is, in the existing technology, a sameness of a data was determined by using a method of testing whether a data for an entire process according to each I/O was matched.

FIG. 3 illustrates a problem in the data comparing method in the conventional method. The sizes of a data of log sample 1 and log sample 2 in the process to be compared do not always match. In most cases, data sizes do not match. In order to compare the sameness of the data, input 1 and input 2 may be respectively input to the Siamese network. However, if the size of input 1 changes in Siamese network A, a problem arises that Siamese network A becomes a different Siamese network B without maintaining a learned content in network A. Therefore, there is a need to adjust the sizes of input 1 and input 2 in Siamese network A.

SUMMARY

Embodiments of the inventive concept provide a pre-processing method of a data for learning a Siamese network.

The technical objectives of the inventive concept are not limited to the above-mentioned ones, and the other unmentioned technical objects will become apparent to those skilled in the art from the following description.

The inventive concept provides a method for processing data generated at a substrate treating. The method includes dividing the data according to each process of the substrate treating; and converting the divided data to a same size.

In an embodiment, converting the divided data to a same size comprises converting the divided data to the same size using an ID convolution.

In an embodiment, the same size is the greatest data among the divided data.

In an embodiment, the same size is a data size for input to a Siamese network.

In an embodiment, the method further comprises assembling the converted data with the same size.

In an embodiment, a computer-readable recording medium having a program for executing the method is included.

The inventive concept provides a method for comparing data of a first facility and data of a second facility. The method includes pre-processing first data of the first facility; pre-processing second data of the second facility; and determining whether the pre-processed first data of the first facility and the pre-processed second data of the second facility are the same.

In an embodiment, pre-processing first data of the first facility comprises: dividing the first data of the first facility according to each process of a substrate treating by the first facility; and converting the divided first data to a same size.

In an embodiment, pre-processing second data of the second facility comprises: dividing the second data of the second facility according to each process of a substrate treating by the second facility; and converting the divided second data to a same size.

In an embodiment, converting the divided first data and the divided second data to a same size, respectively comprising converting the divided first data and the divided second to the same size an ID convolution, respectively.

In an embodiment, the same size is the greatest data among the divided first data and the divided second data, respectively.

In an embodiment, the same size is a data size for input to a Siamese network. In an embodiment, In an embodiment, the method further comprises assembling the converted first data.

In an embodiment, the method further comprises assembling the converted second data.

In an embodiment, the determining whether the pre-processed first data of the first facility and the pre-processed second data of the second facility are the same comprising determining using Siamese network.

In an embodiment, the method comprises determining, by the Siamese network, the similarity of data between the assembled first data and the assembled second data.

In an embodiment, a computer-readable recording medium having a program for executing the method is included.

According to an embodiment of the inventive concept, by proposing a pre-processing method of a data for learning a Siamese network, a problem where a learning using a deep learning cannot be performed due to many data being provided in different lengths may be resolved.

The effects of the inventive concept are not limited to the above-mentioned ones, and the other effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 to FIG. 2 illustrate a data comparing method in a conventional method.

DETAILED DESCRIPTION

Figure 2:
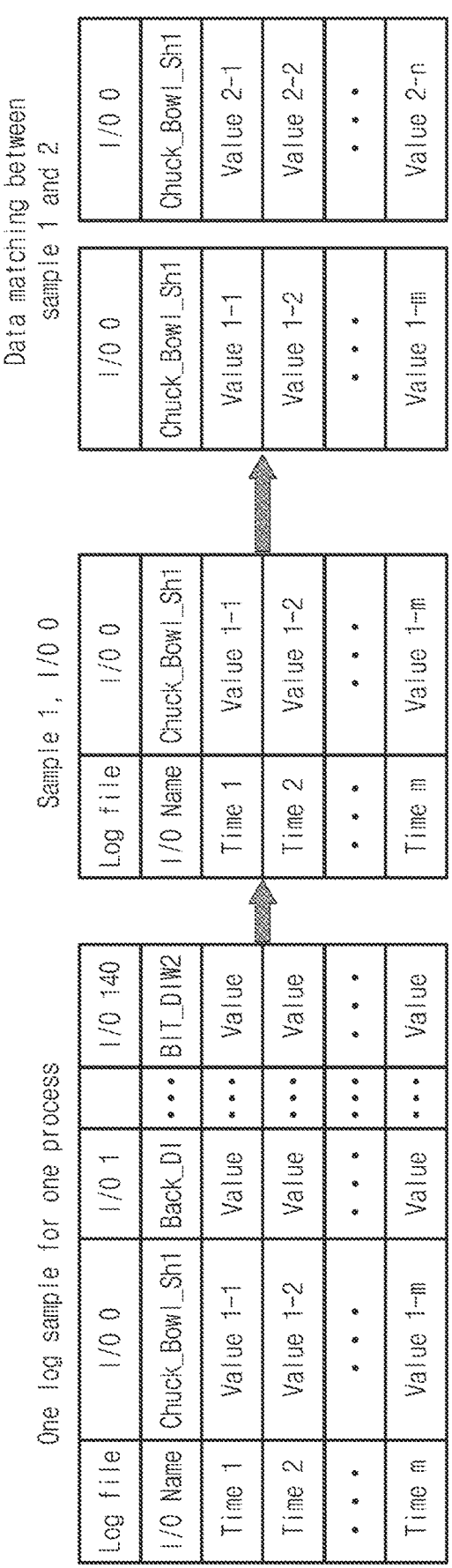
Figure 3:
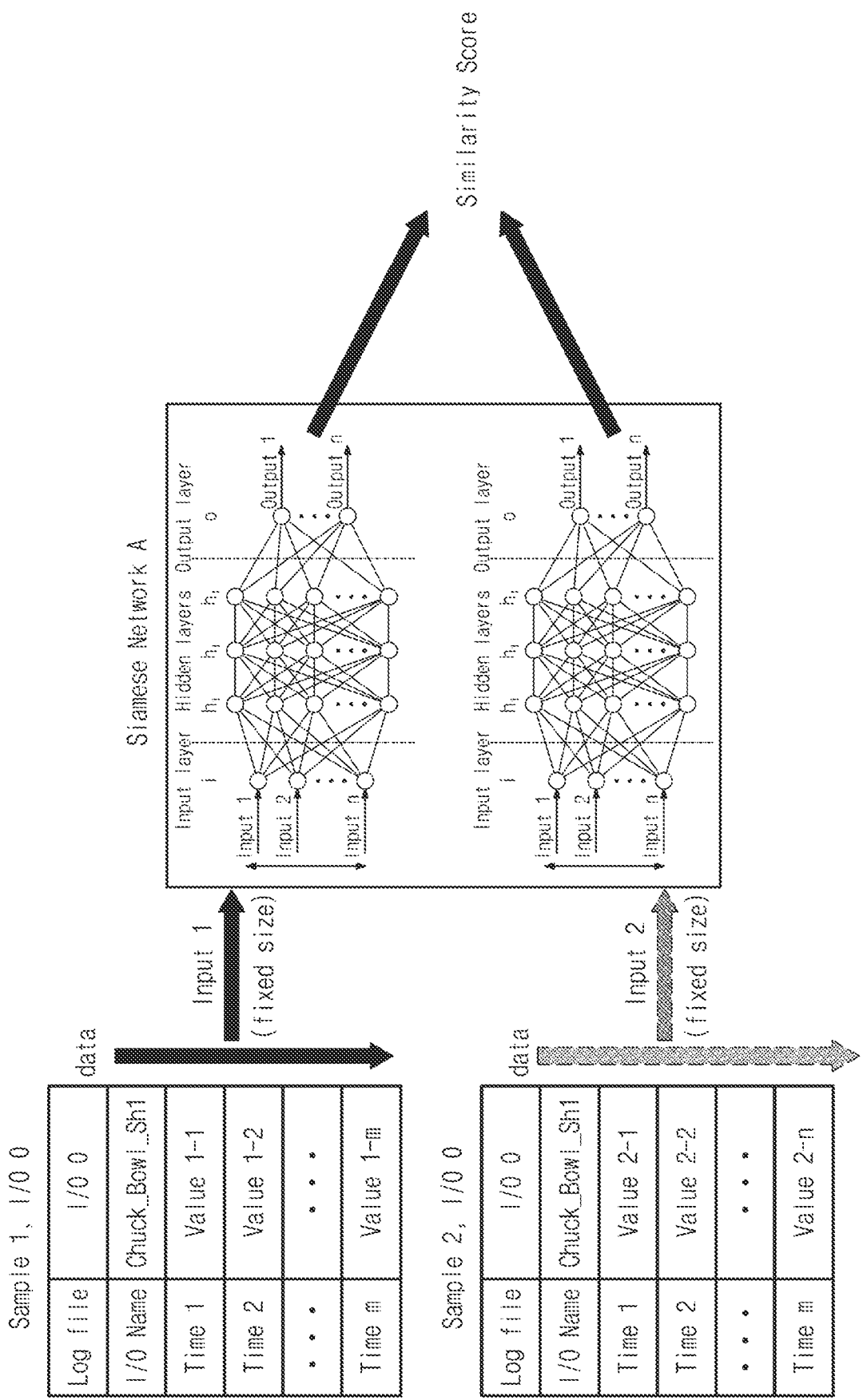
FIG. 3 illustrates a problem in the data comparing method in the conventional method.

The inventive concept may be variously modified and may have various forms, and specific embodiments thereof will be illustrated in the drawings and described in detail. The embodiment is provided to more fully explain the inventive concept to a person with average knowledge in the art. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear. Also, the same sign is used through the drawings for parts that have similar functions and actions.

The terminology used herein is for the purpose of describing particular embodiments only and is not intended to be limiting of the inventive concept. It will be further understood that the terms "comprises", "comprising,", "includes", and/or "including" when used in this specification, specify the presence of stated features, integers, steps, operations, elements, and/or components, but do not preclude the presence or addition of one or more other features, integers, steps, operations, elements, components, and/or groups thereof.

Singular expressions include plural expressions unless they are explicitly meant differently in context. In addition, the shapes and sizes of elements in the drawings may be exaggerated for clearer description.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Figure 4:
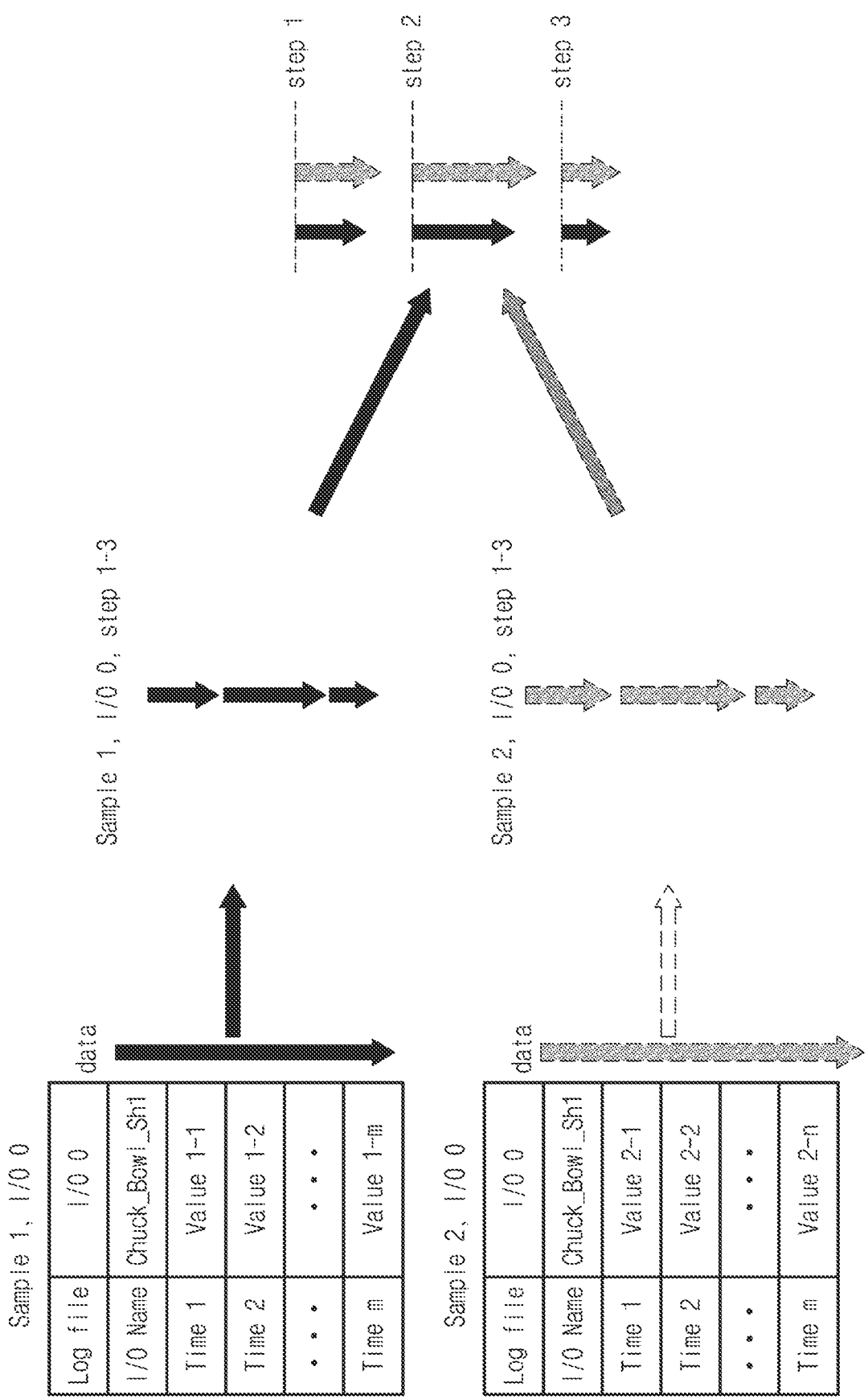
FIG. 4 to FIG. 5 illustrate the data comparing method according to the inventive concept.
Figure 5:
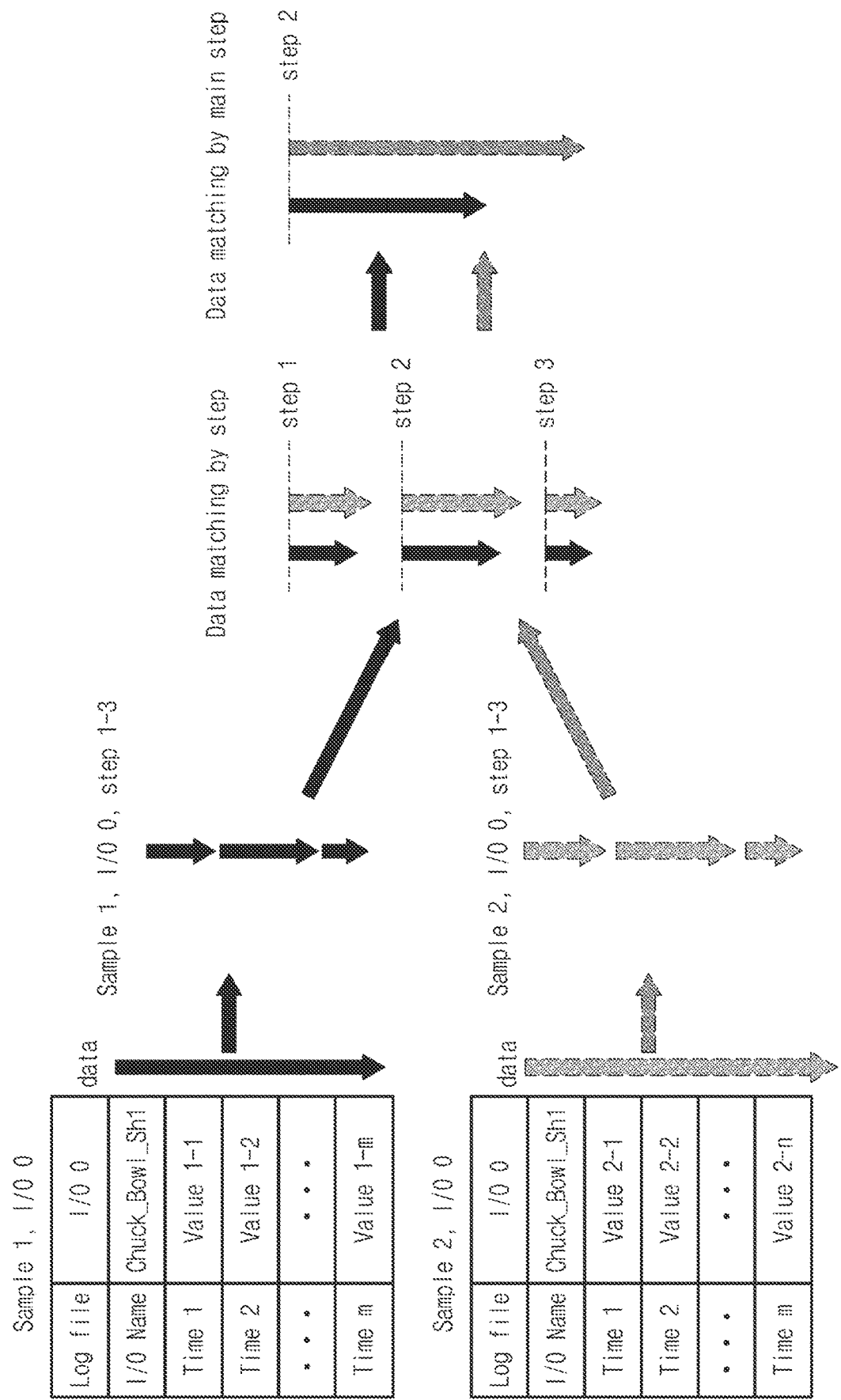

FIG. 4 to FIG. 5 illustrate a data comparing method according to the inventive concept.

Referring to FIG. 4, an embodiment of comparing the data of sample 1 and sample 2 which are each different from each other is disclosed. Sample 1 and sample 2 show different result samples obtained for the same process. According to an embodiment, sample 1 may be a result data processed in a first substrate treating facility. According to an embodiment, sample 2 may be a result data processed in a second substrate treating facility. In other words, the sample 1 and the sample 2 may be samples obtained from the same treating process performed by the first substrate treating facility and the second substrate treating facility, respectively.

Sample 1 and sample 2 may be a time series data of each treating facility, respectively. Since a processing time of each treating facility varies from time to time, a size of the data may not match when compared on its own. To solve this problem, in the inventive concept, when determining whether sample 1 and sample 2 are the same, the data sample may be cut and compared according to each process step of each data sample. However, referring to FIG. 4, there may be a problem that a length of each respective process step does not match either.

According to the inventive concept, the data may be converted by using a 1D convolution in a method for dividing the data according to each respective process step and for substantially equally adjusting the length of the data according to each respective process step. This will be described in more detail with reference to FIG. 6 and FIG. 7.

Referring to FIG. 4, sample data 1 and sample data 2 may be respectively divided according to each process step. According to an embodiment of FIG. 4, sample data 1 and sample data 2 may be divided into three process steps. Referring to FIG. 4, it may be seen that the length of the data divided according to each process step for sample data 1 and the length of the data divided according to each process step for sample data 2 are different.

In order to adjust a length of the data which differs according to each step, the length of the data in each process step may respectively be converted through the 1D convolution to adjust the length of the data.

Conventionally, when the size of the data is not adjusted, there is a problem that a learning through the Siamese network may not performed, but in the inventive concept, a data pre-processing may be performed to facilitate a learning through the Siamese network through a length adjusting operation. According to an embodiment, since there are nearly 1000 pieces of data, the higher the numbers of the data, the more efficiently the data may be compared.

Referring to FIG. 5, a data divided according to the process steps from sample data 1 and a data divided according to the process steps from sample data 2 may be selected to be compared, and only a data of the corresponding steps may be size-converted.

According to an embodiment, when comparing a current data with a normal data to find an abnormal I/O, a data of a specific I/O may be selected. Referring to FIG. 5, a selected process step may be step 2. That is, a conversion may be performed only on a data of a process step which a determination is to be made on whether a change has occurred without performing the conversion of all steps. In the following embodiment, it will be assumed and described as an example of performing a data size conversion for all of the process steps.

Referring to FIG. 4 to FIG. 5, the sizes of the data divided according to each process step may all be different. The conditions for determining a reference size for adjusting them may be as follows. According to an embodiment, it may be converted to a size suitable for inputting to the Siamese network. That is, it may be converted to a size matching an input size of a deep learning neural network. According to another embodiment, it may be converted to a size matching a largest size of the data of the process step selected among the process steps.

In this case, the data conversion may be performed using the 1D convolution.

Figure 6:
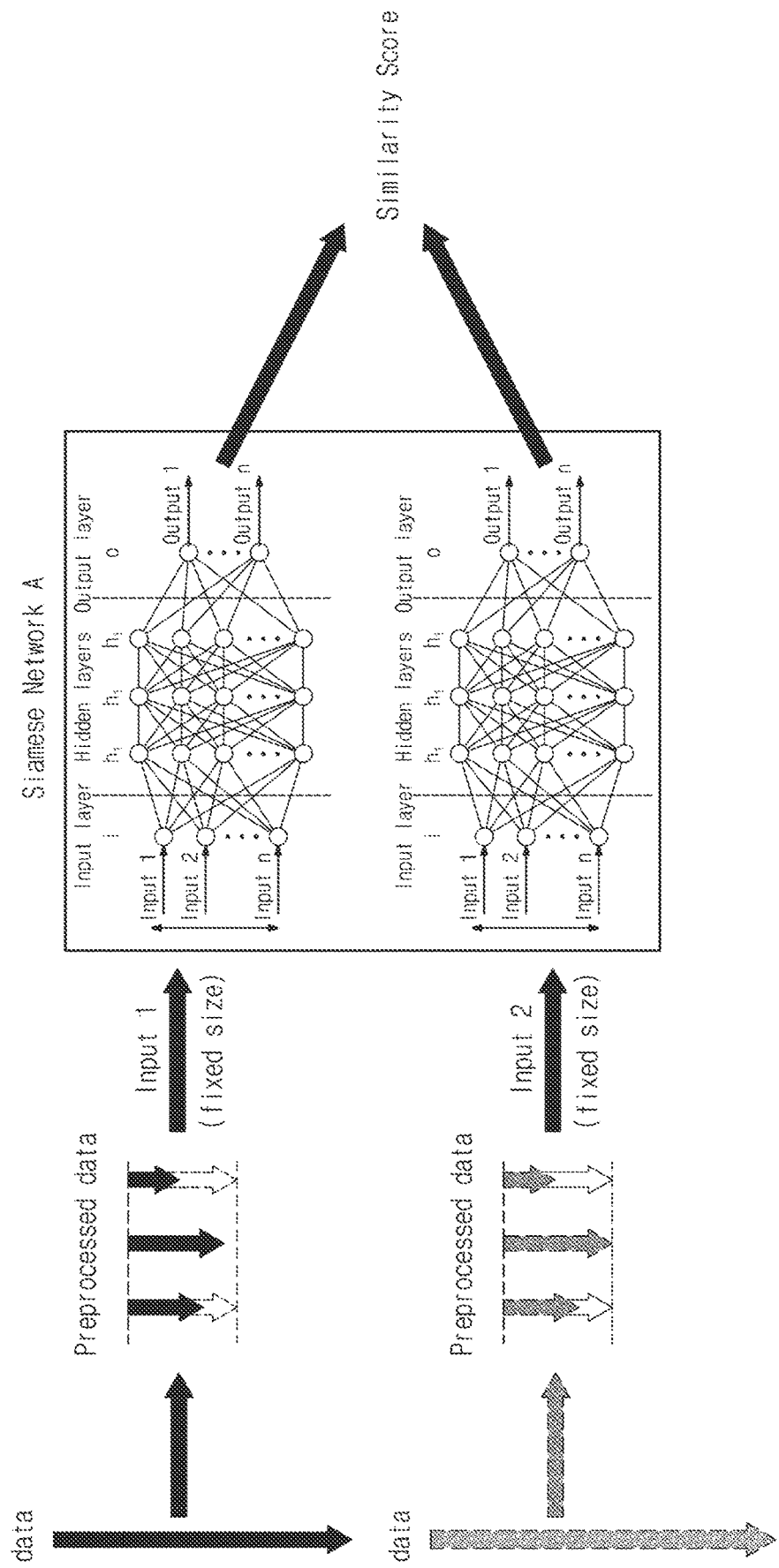
FIG. 6 illustrates a data comparing through the data comparing method according to the inventive concept.

FIG. 6 illustrates the data comparison through a data comparing method according to the inventive concept.

Referring to FIG. 6, sample data 1 (top) and the sample data 2 (bottom) may be divided according to each process step. The sizes of the data according to each process step may differ even within the first sample data, and they may each differ even within the corresponding process steps of sample data 1 and sample data 2. To match these, it is possible to create an input value of a fixed size through the 1D convolution. This may be processed as an input value of the Siamese network.

Figure 7:
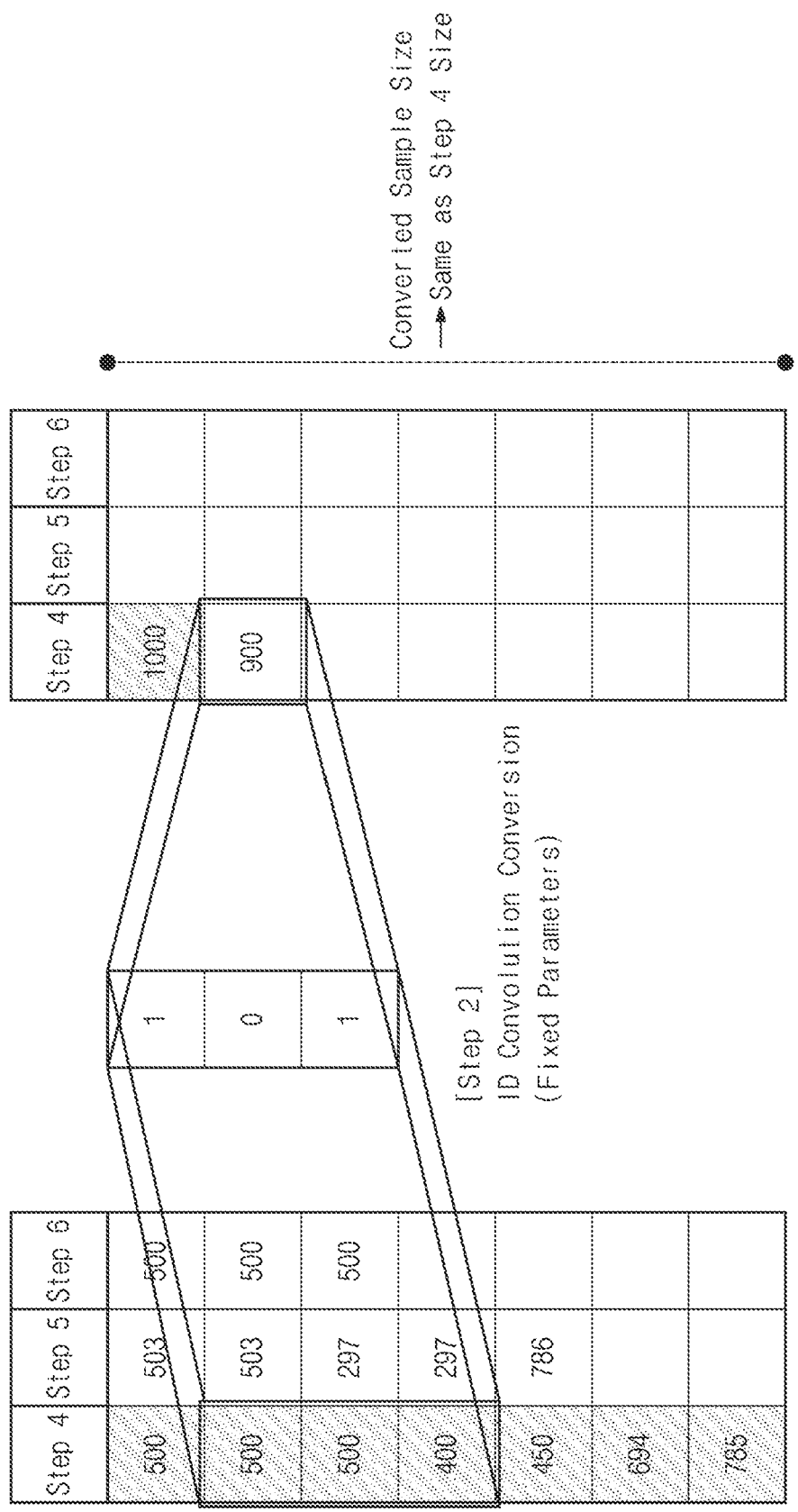
FIG. 7 illustrates an embodiment of a 1D convolution.

FIG. 7 illustrates an embodiment of the 1D convolution.

Referring to FIG. 7, a time series data according to each process step is disclosed. Referring to FIG. 7, an embodiment of converting the data in step 4 through the 1D convolution is disclosed. In this case, a parameter of the 1D convolution may be provided as a fixed value. In this way, by performing a data conversion of the data according to each process step through the ID convolution, it may be possible to derive a result value of a fixed size. A data value and a parameter value in the 1D convolution in FIG. 7 are only an embodiment, and the parameter value of the 1D convolution may be differently applied according to characteristics to be extracted.

Figure 8:
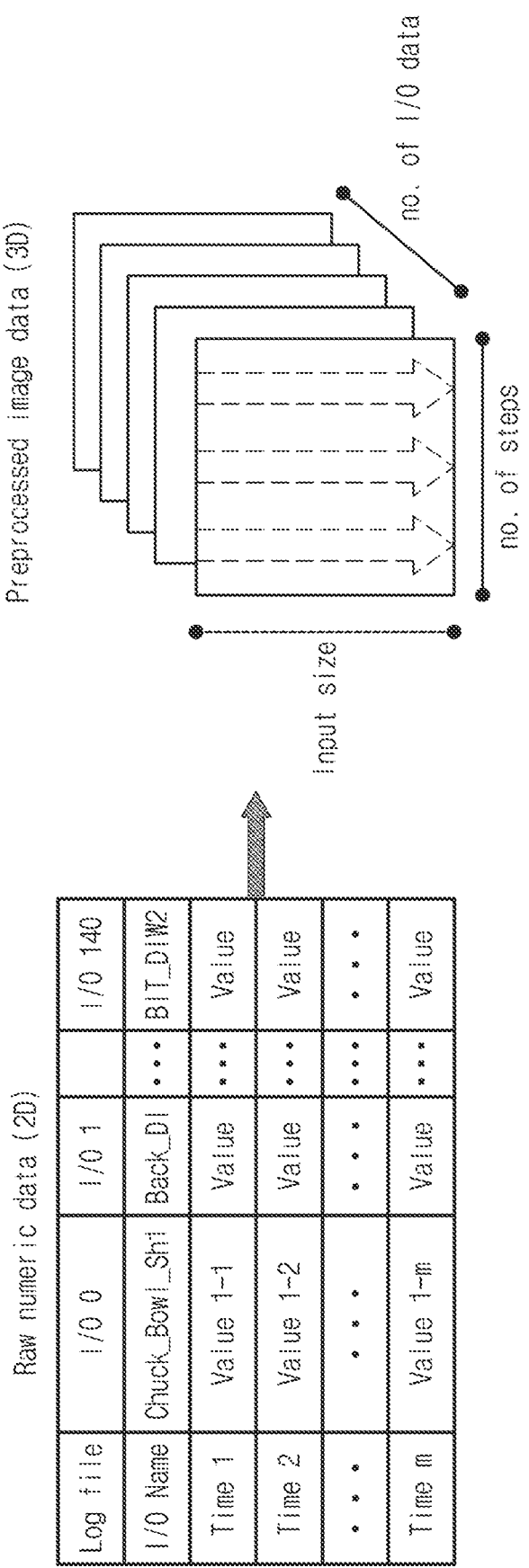
FIG. 8 illustrates a data assembling according to the data comparing method according to an embodiment of the inventive concept.

FIG. 8 illustrates a data assembling according to the data comparing method according to an embodiment of the inventive concept.

Referring to FIG. 8, there is an effect of being able to input into a Siamese network by converting a time series data of a substrate treating facility into a pre-processed image data form. According to an embodiment, all input sizes may be set to be the same to be converted, and one input data may be set by assembling according to each process step. A plurality of input data may be a result of performing a same process step in different facilities. Alternatively, the plurality of input data may be a result of performing the same process step with a time difference in the same facility.

As shown in FIG. 8, after converting lengths of the process steps having different lengths respectively, they may be assembled in one plane and thereby changed to an optimal shape that may be input to a deep learning, therefore making an application easier.

Figure 9:
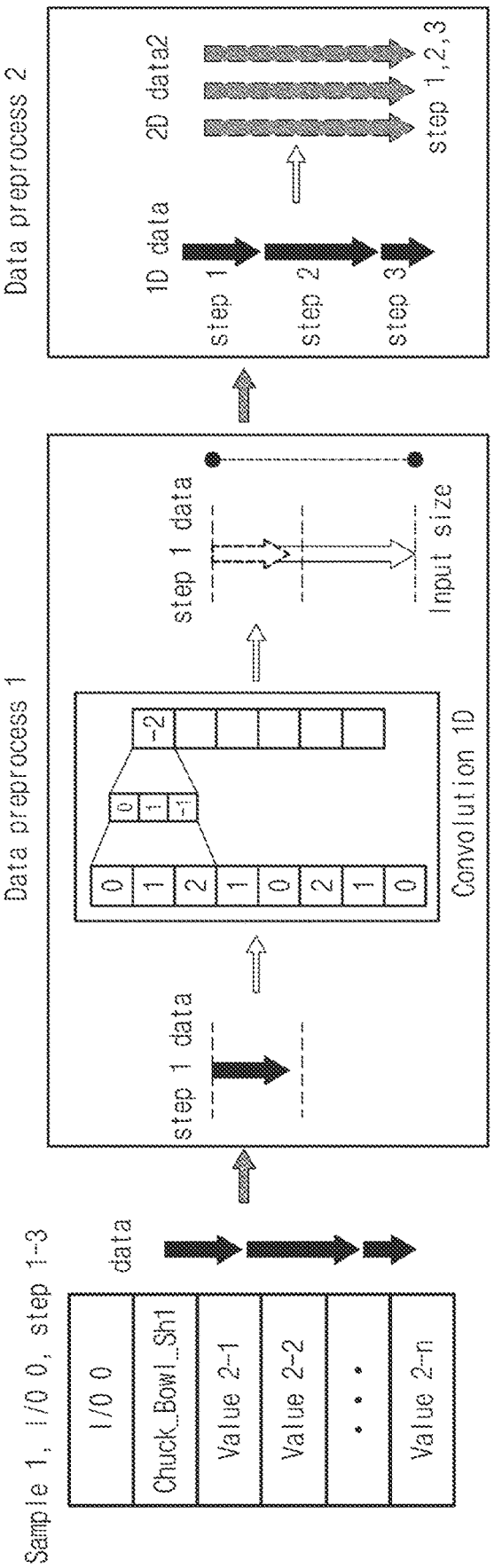
FIG. 9 illustrates an intermediate process of FIG. 8.
Figure 10:
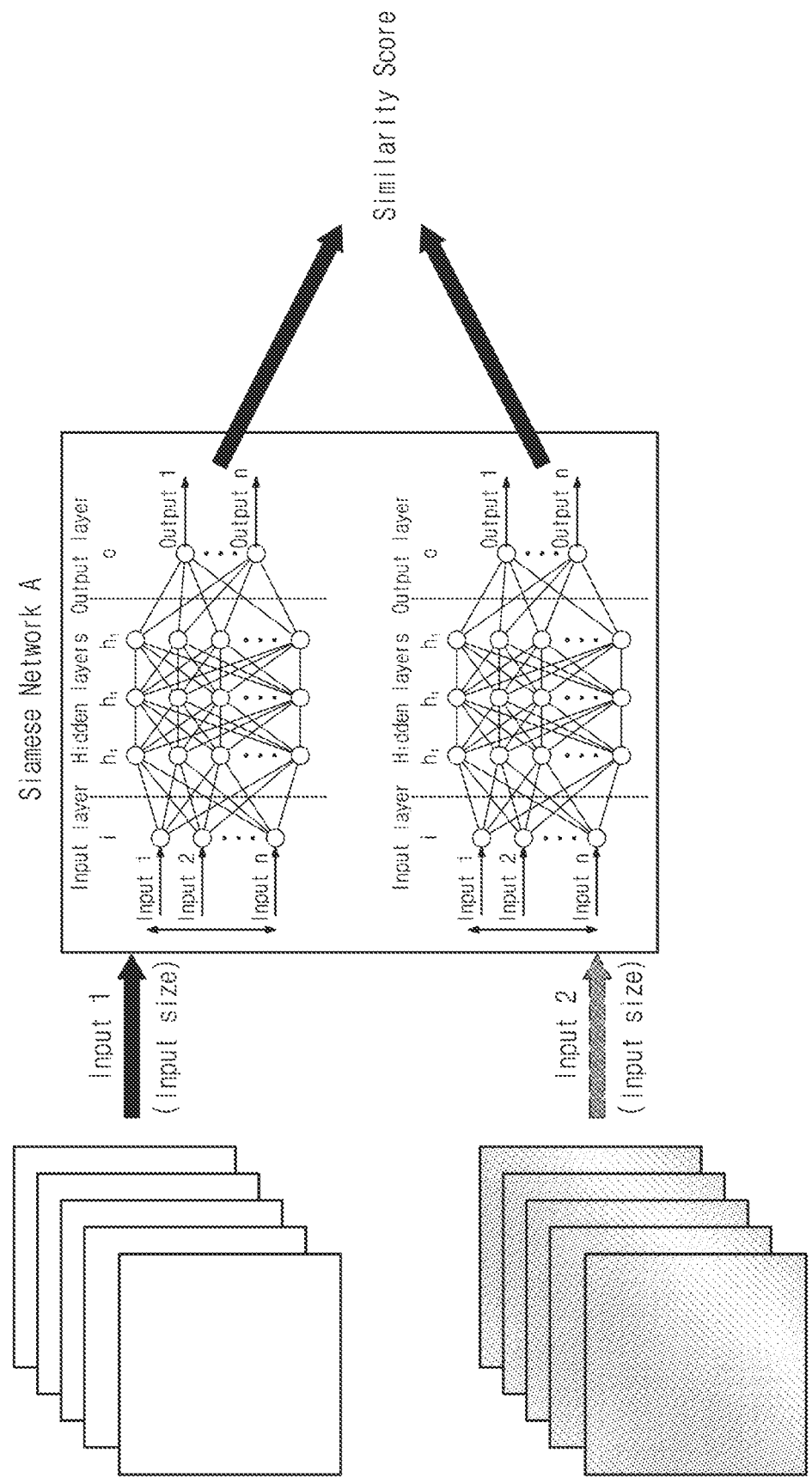
FIG. 10 illustrates an application of an assembled data according to the inventive concept.

FIG. 9 illustrates an intermediate process of converting from 2D to 3D of FIG. 8. FIG. 10 illustrates an application of an assembled data according to the inventive concept.

According to the inventive concept, when a matching rate (similarity) is calculated for log data 1 and log data 2 of a facility, a similarity that reflects characteristics of the data for each process step may be calculated by testing according to segmented process steps, while the conventional way was to test according to one process unit.

Referring to FIG. 9, in the conventional technology, the similarity is calculated by dividing a log data into I/O data units and then further subdividing according to each process step. When performing a test, starting points for each process step may be the same. According to the inventive concept, it is possible to test whether the data according to the process step is matched according to each I/O data. According to the inventive concept, when inspecting a similarity of the log data of two facilities through a deep learning, the similarity of the log data may be divided according to I/O and each process step and inspected by a data pre-processing.

Referring to the first figure of FIG. 9, when the process data is cut according to each process step, the data size of each step is not constant. Referring to FIG. 10, sizes of input 1 and input 2 of the Siamese network are the same and should be provided constantly. According to the inventive concept, going through the pre-processing process, the sizes of different process step data may become the same as the input size.

Referring back to the second figure of FIG. 9, when pre-processing the log data of a facility, the process step data in various sizes may be converted into an input size of the deep learning to perform the pre-processing. In this case, the input size for preprocessing may be set to a maximum value among the sizes of the process step data. Alternatively, the pre-processing may be performed at a size suitable for the input size of the deep learning to be applied. When converting the log data of the facility to the input size, it may be converted using the 1D convolution.

Referring to the third figure of FIG. 9, the process step data obtained by a first pre-processing (1D convolution) may be combined according to each I/O to generate a 2D data. That is, it may be made into a state for inputting data through assembling the process step data. Referring to FIG. 10, the 3D data may be finally set as one input data by combining all the 2D data of the remaining I/Os.

Figure 11:
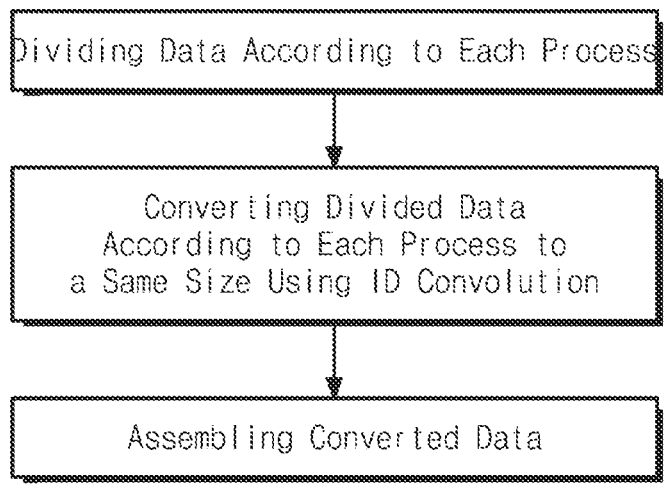
FIG. 11 is a flowchart illustrating the data processing method according to an embodiment of the inventive concept.

FIG. 11 is a flowchart illustrating the data processing method according to an embodiment of the inventive concept.

The method of performing a processing of a data generated during a substrate treating process may include: a step for dividing the data according to each process step, a step for converting the data divided according to each process step to a same size through 1D convolution, and a step for assembling a data divided according to each process step. In this way, the data divided according to each process step can be converted to the same size, and by assembling them they can be converted to an input data applicable in deep learning.

Figure 12:
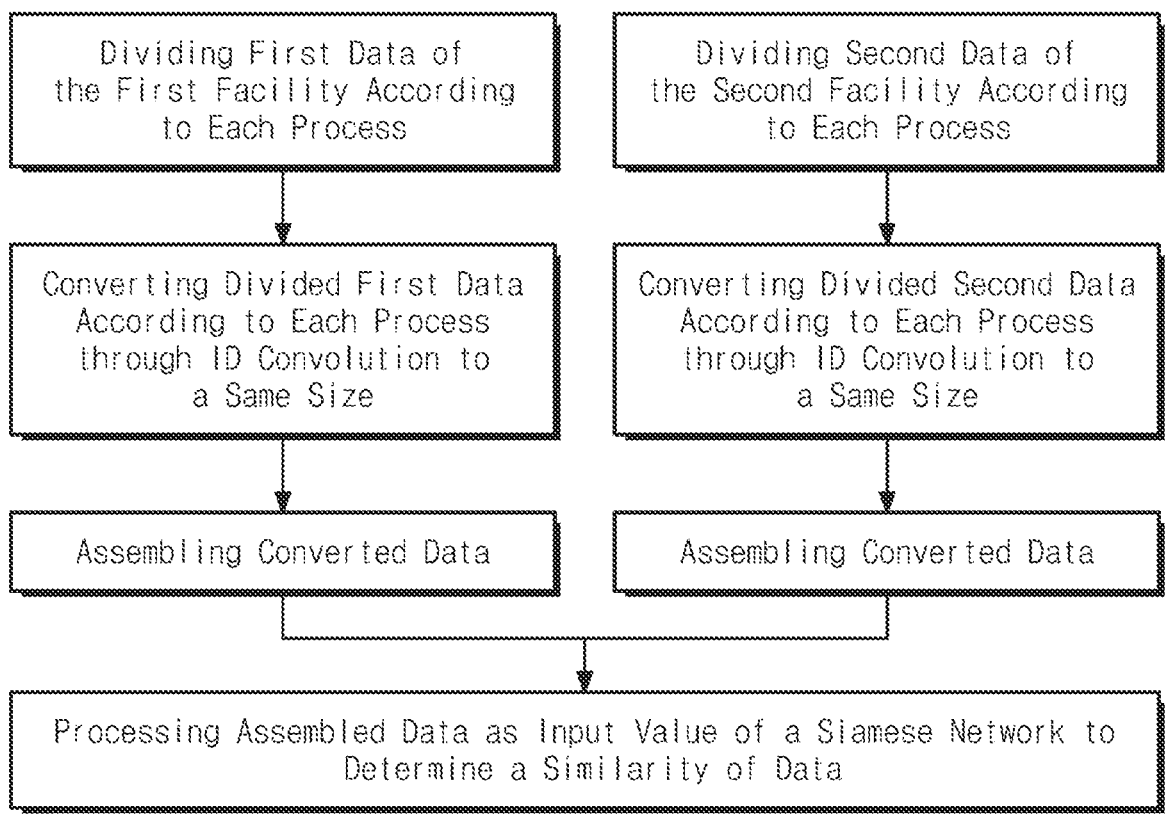
FIG. 12 is a flowchart illustrating the data comparing method according to an embodiment of the inventive concept.

FIG. 12 is a flowchart illustrating the data comparing method according to an embodiment of the inventive concept.

For convenience, each data of the first facility and the second facility will be described as an example of comparison. In this case, a step for pre-processing the first data of the first facility, a step for pre-processing the second data of the second facility, and a step for determining whether a pre-processed data of the first facility and a pre-processed data of the second facility are the same may be included.

The step for pre-processing the first data of the first facility may include a step for dividing the first data of the first facility according to each process step, and a step for converting the first data divided according to each process step to a same size.

The step for pre-processing the second data of the second facility may include a step for dividing the second data according to each process step, and a step for converting the second data divided according to each process step to a same size.

In this case, the size conversion may be converted using the 1D convolution.

Each of the converted data may be assembled according to each of the first data and the second data and may be provided in the form of the 2D data. An assembled data may be input as an input value of the Siamese network and used to determine a similarity.

According to the inventive concept, by proposing a pre-processing method of a data for learning a Siamese network, a problem where a learning using a deep learning cannot be performed due to many data being provided in different lengths may be resolved.

Meanwhile, the data processing method and the data comparing method according to an embodiment of the inventive concept described above may be implemented in the form of a program command that may be performed through various computer means and recorded in a computer-readable recording medium. In this case, the computer-readable recording medium may include a program command, a data file, a data structure, or the like alone or in combination. Meanwhile, the program command recorded on the recording medium may be specially designed and configured for the inventive concept or may be known to and usable by those skilled in the computer software.

The computer-readable recording medium may include hardware devices specifically configured to store and execute program instructions such as a magnetic media such as a hard disk, a floppy disk, and a magnetic tape, optical media such as a CD-ROM and a DVD, magneto-optical media such as a floptical disk, and a ROM, a RAM, a flash memory, and the like. In addition, program instructions include machine language codes such as those created by compilers, as well as advanced language codes that can be executed by computers using interpreters, etc. The above-described hardware device may be configured to operate as one or more software modules to perform the operation of the inventive concept.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A method for processing time series data generated at a substrate treating facility, the method comprising:
    dividing a first data of a first facility according to each process of substrate treating by the first facility;
    dividing a second data of a second facility according to each process of substrate treating by the second facility;
    converting the divided first data and the divided second data to a same size using 1D convolution, wherein the same size is a data size for input to a Siamese network;
    assembling the converted first data and the converted second data into a first plane and a second plane, respectively, wherein each of the first plane and the second plane includes a 2D convolution representing an individual process of substrate treating;
    combining a plurality of 2D convolutions to generate a 3D convolution, wherein each 2D convolution of the plurality of 2D convolutions represents a separate and distinct process of substrate treating; and
    determining, using the Siamese network, whether the assembled first data and the assembled second data are the same.

2. The method of claim 1, wherein the same size is a greatest data among the divided data.

3. The method of claim 1, wherein the same size is a data size for input to a Siamese network.

4. The method of claim 1, wherein assembling the converted data with the same size includes assembling the converted data into a single plane.

5. A computer-readable recording medium having a program for executing the method of claim 4.

6. The method of claim 1, wherein assembling the converted data with the same size includes assembling the converted data to generate a 2D convolution representing an individual process of substrate treating.

7. The method of claim 6, further comprising:
    combining a plurality of 2D convolutions to generate a 3D convolution, wherein each 2D convolution of the plurality of 2D convolutions represents a separate and distinct process of substrate treating.

8. A method for comparing time series data generated at a substrate treating of a first facility and data of a second facility, the method comprising:
    pre-processing first data of the first facility, wherein pre-processing first data of the first facility includes:
    dividing the first data of the first facility according to each process of a substrate treating by the first facility; and
    converting the divided first data to a same size using 1D convolution, wherein the same size is a data size for input to a Siamese network;
    pre-processing second data of the second facility, wherein pre-processing second data of the second facility includes:
    dividing the second data of the second facility according to each process of a substrate treating by the second facility; and
    converting the divided second data to a same size using 1D convolution, wherein the same size is the data size for input to the Siamese network;
    assembling the pre-processed first data and second data into a first plane and a second plane, respectively, wherein each of the first plane and the second plane includes a 2D convolution representing an individual process of substrate treating;
    combining a plurality of 2D convolutions to generate a 3D convolution, wherein each 2D convolution of the plurality of 2D convolutions represents a separate and distinct process of substrate treating; and
    determining, using the Siamese network, whether the assembled first data and the second data are the same.

9. The method of claim 8, wherein the same size is a greatest data among the divided first data and the divided second data, respectively.

10. The method of claim 8, wherein the same size is a data size for input to a Siamese network.

11. The method of claim 9, further comprising assembling the converted first data.

12. The method of claim 11, further comprising assembling the converted second data.

13. The method of claim 12, wherein the determining whether the pre-processed first data of the first facility and the pre-processed second data of the second facility are the same comprises determining using a Siamese network.

14. The method of claim 13, further comprising determining, by the Siamese network, the similarity of data between the assembled first data and the assembled second data.

15. A computer-readable recording medium having a program for executing the method of claim 14.

16. A non-transitory computer-readable medium including one or more programs that, when executed by a computer, perform a method for comparing time series data generated at a plurality of substrate treating facilities, the method comprising:
- dividing a first data of a first facility according to each process of substrate treating by the first facility;
- dividing a second data of a second facility according to each process of substrate treating by the second facility;
- converting the divided first data and the divided second data to a same size using 1D convolution, wherein the same size is a data size for input to a Siamese network;
- assembling the converted first data and the converted second data into a first plane and a second plane, respectively, wherein each of the first plane and the second plane includes a 2D convolution representing an individual process of substrate treating;
- combining a plurality of 2D convolutions to generate a 3D convolution, wherein each 2D convolution of the plurality of 2D convolutions represents a separate and distinct process of substrate treating; and
- determining, using the Siamese network, whether the assembled first data and the assembled second data are the same.

17. The non-transitory computer-readable medium of claim 16, wherein the 1D convolution is provided as a fixed value.

* * * * *